Sept. 3, 1929.   G. B. EGGERT   1,726,812
PROPORTIONING APPARATUS
Filed Feb. 25, 1928   2 Sheets-Sheet 1

Gustav B. Eggert,
INVENTOR.

BY George B. Willcox
ATTORNEY.

Patented Sept. 3, 1929.

1,726,812

UNITED STATES PATENT OFFICE.

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK.

PROPORTIONING APPARATUS.

Application filed February 25, 1928. Serial No. 256,989.

This invention is a proportioning apparatus by which a number of different materials in powder or granular form can be simultaneously delivered to a conveyor or other receptacle in any desired proportion.

The invention is well adapted for mixing various grades of flour, and for that reason it is especially useful in bakeries where it is required to proportionally mix large quantities of flour of various kinds.

The machine is capable of delivering two kinds of material in any desired proportion and can be quickly adapted to mix three or more, any two of which can be easily varied as to their relative proportions.

My invention applies more particularly to a proportioning machine of the type in which a hopper is employed having movable partitions therein which divide the hopper into compartments of various sizes for the purpose of adjusting the machine to deliver any required proportion of the different materials.

The novel features of my improvement include means for insuring that the delivered proportions as fixed by the adjustment of the partitions will be maintained, even though the rate of operation of the machine itself may be varied. I employ a new means for removing the material simultaneously from all the compartments. It consists in an improved arrangement of conveyor troughs and the conveyors therein. The objects attained by the new conveyor arrangement are positive operation and no liability of gumming or sticking as when trains of rolls are employed.

Another object is to secure a more uniform rate of feed from each compartment of the mixing screw which is common to all the compartments and also to avoid all liability of causing the material to pack on the screws, consequently assuring easy running.

With the foregoing and certain other objects in view, which will appear later in the specification, my invention comprises the devices described and claimed and the equivalents thereof.

In the drawings Fig. 1 is a top plan view.

Figure 1:
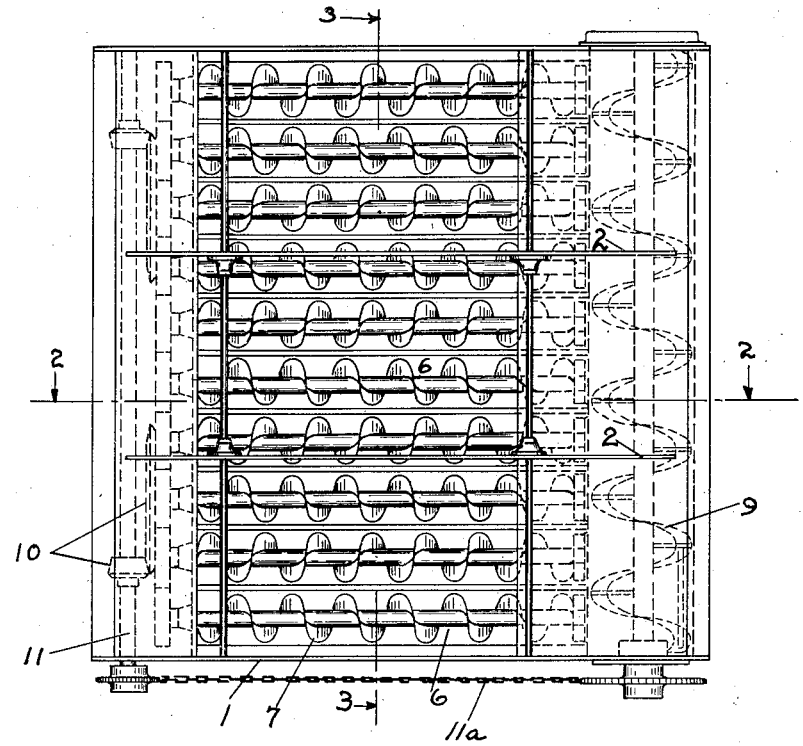

As is clearly shown in the drawings, the body of the proportioning machine consists essentially in a box-like hopper 1.

For proportionally delivering a number of different materials from the hopper and for variously fixing the proportions according to any desired formula, I provide in the hopper, as is commonly done in this class of machines, one or more vertical partitions 2 arranged so they can be moved sidewise to divide the hopper into two or more compartments. I have shown two such partitions, making three compartments.

The means by which the partitions are fixed in place, and also the means for moving them, may be of any desired construction and arrangement. I prefer, however, the well known arrangement shown in Figs. 2 and 3, where two supporting bars 3, 3 span the hopper from side wall to side wall. The partitions 2 are apertured to receive and slide along the bars 3, 3 and are held substantially vertical by means of tubular sleeves or bearings 4 that can be clamped to the bars by set screws 5.

I will now describe the novel means which operate in conjunction with the movable partitions, whereby I attain the above stated objects of my invention.

The bottom of the hopper is made up of a plurality of conveyor troughs 6 arranged side by side and close together. In each trough is a screw conveyor 7. The side walls 8 of the troughs project upward a short distance above the top working surfaces of the conveyors 7. All the conveyors are arranged to deliver their material at one end of the hopper. They may discharge into a collecting ribbon conveyor 9 as shown in the drawings, or into any other suitable receptacle. The conveyors 7 are all driven simultaneously and at speeds that are in fixed proportion to each other, preferably equal. The means by which the conveyors 7 are driven depends upon the kind of conveyor employed. For purpose of illustration, I have shown in the drawings screw conveyors driven by suitable gearing 10 which receives motion from a drive shaft 11. This may be driven by a chain 11ª from the shaft of conveyor 9. I prefer the screw or ribbon type of conveyor for proportioning flour mixtures, but any other suitable kind of conveyors may be employed without departing from my invention as claimed.

The partitions 2 are illustrated as set to deliver material in the proportions 3 : 4 : 3, there being three conveyors in each of the outer compartments and four in the middle compartment. Material thrown into either compartment will be delivered therefrom at a rate proportional to the number of conveyors that comprise its bottom. If the speed of the drive shaft 11 varies, the relative proportions of the delivered materials will still remain constant.

Figure 2:
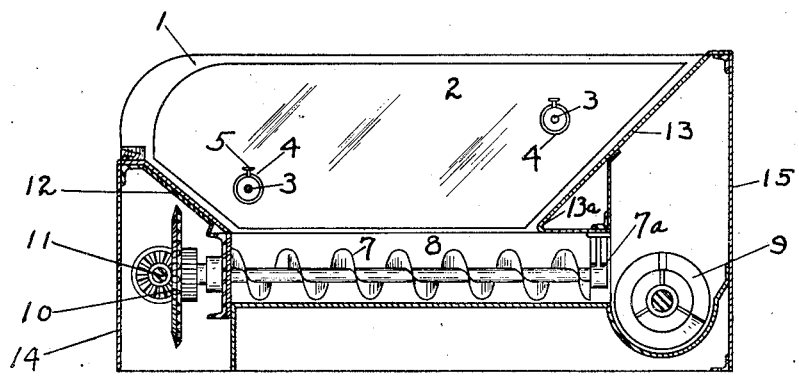
Fig. 2 is a vertical sectional view on the line 2—2 of Fig. 1.
Figure 3:
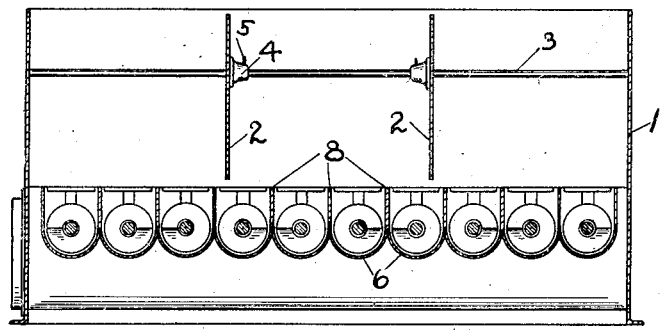
Fig. 3 is a vertical section on line 3—3 of Fig. 1.
Figure 4:
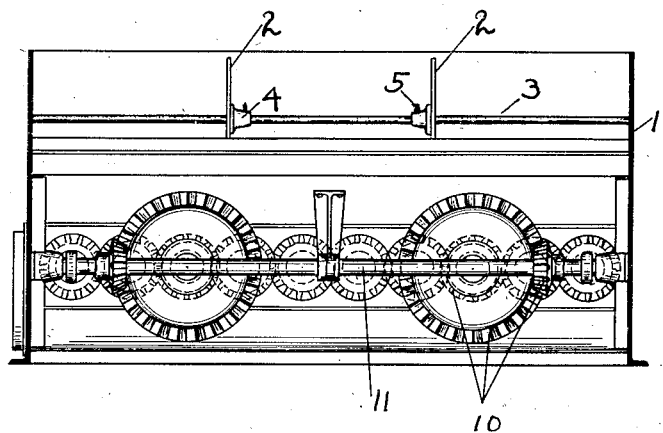
Fig. 4 is a front end view with the front wall removed.

In order to make the machine compact and self contained, and to properly protect the working parts so as to avoid accident, I have incorporated certain novel structural features. For example, the front and back walls 12, 13 of the hopper converge downwardly as shown in Fig. 2. This enables short conveyors to be employed and permits the driving gears 10 and main drive shaft 11 to be disposed underneath the over-hanging wall 12 of the hopper, and also permits the collecting conveyor 9, as well as the outboard bearings 7ª for the proportioning conveyors 7 to be located underneath the other over-hanging wall 13 of the hopper. The over-hanging ends may be closed in by end plates 14, 15.

The lower end 13ª of wall 13 overhangs the delivery end of the screw 7 sufficiently to prevent flour from escaping direct from the compartment into conveyor 9 without first being subjected to the measuring action of screw 7.

By the means above described I have produced a simple, compact, strong and efficient proportioning machine that takes different kinds of material as dumped from barrels or sacks, and delivers them in any desired or predetermined proportion, the proportions being constant, regardless of the rate at which the machine as a whole may be operated.

Having thus described my invention, what I claim and desire to secure by Letters Patent is:

1. In a proportioning machine comprising a hopper having movable dividing walls, the bottom of said hopper formed of a plurality of conveyor troughs parallel to said dividing walls and separated by side walls that are adapted when in alinement with a movable dividing wall to form therewith a partition within said hopper, conveyors for moving material lengthwise said troughs, and driving means for said conveyors.

2. In a proportioning machine comprising a hopper having movable dividing walls, the bottom of said hopper formed of parallel conveyor troughs arranged close together and separated by the common side walls of adjacent troughs, said side walls adapted when in alinement with said movable dividing wall to form therewith a partition for said hopper, conveyors in said troughs and a common driving means for said conveyors, and a collecting conveyor at the ends of said troughs, for the purposes set forth.

3. In a proportioning machine comprising a hopper having movable dividing walls, the bottom of said hopper formed with parallel conveyor troughs separated by side walls of adjacent troughs, said side walls adapted when in alinement with a movable dividing wall to form therewith a partition for said hopper, a screw conveyor in each trough and driving means for rotating said conveyors simultaneously at predetermined relative speeds.

4. A structure as set forth in claim 1 wherein the said hopper is formed with an end that overhangs outwardly the discharge end of each screw conveyor, the said driving means disposed beneath said overhanging end, for the purposes set forth.

5. A structure as set forth in claim 2 wherein the hopper is formed with an outwardly overhanging end wall, said common driving means and collecting conveyor being disposed beneath said overhanging end wall.

In testimony whereof, I affix my signature.

GUSTAV B. EGGERT.